United States Patent
Bhardwaj et al.

(10) Patent No.: US 10,109,887 B1
(45) Date of Patent: Oct. 23, 2018

(54) 3D-STRUCTURED SOLID STATE BATTERY

(71) Applicant: Google LLC, Mountain View, CA (US)

(72) Inventors: Ramesh Bhardwaj, Freemont, CA (US); Tai Sup Huang, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 325 days.

(21) Appl. No.: 14/561,369

(22) Filed: Dec. 5, 2014

(51) Int. Cl.
| | |
|---|---|
| *H01M 2/02* | (2006.01) |
| *H01M 4/04* | (2006.01) |
| *H01M 10/058* | (2010.01) |
| *H01M 4/525* | (2010.01) |
| *H01M 4/505* | (2010.01) |
| *H01M 10/0562* | (2010.01) |
| *H01M 10/052* | (2010.01) |

(52) U.S. Cl.
CPC ......... *H01M 10/058* (2013.01); *H01M 4/505* (2013.01); *H01M 4/525* (2013.01); *H01M 10/052* (2013.01); *H01M 10/0562* (2013.01)

(58) Field of Classification Search
CPC ....................................................... H01M 2/22
See application file for complete search history.

(56) References Cited

U.S. PATENT DOCUMENTS

| | | | | |
|---|---|---|---|---|
| 5,576,119 | A * | 11/1996 | Yamin | H01M 4/13 429/207 |
| 8,835,029 | B2 | 9/2014 | Ellis-Monaghan et al. | |
| 9,166,230 | B1 * | 10/2015 | Lahiri | H01M 10/4235 |
| 2006/0154141 | A1 * | 7/2006 | Salot | H01M 4/0423 429/149 |
| 2009/0170001 | A1 | 7/2009 | Roozeboom et al. | |
| 2010/0190051 | A1 * | 7/2010 | Aitken | H01M 2/1061 429/162 |
| 2013/0220546 | A1 | 8/2013 | Kim et al. | |
| 2013/0260183 | A1 | 10/2013 | Ellis-Monaghan et al. | |

FOREIGN PATENT DOCUMENTS

| | | |
|---|---|---|
| WO | 2010032159 A1 | 3/2010 |
| WO | 2014028853 A1 | 2/2014 |

* cited by examiner

*Primary Examiner* — Stephan J Essex
(74) *Attorney, Agent, or Firm* — McDonnell Boehnen Hulbert & Berghoff LLP

(57) ABSTRACT

This disclosure relates to a battery and a method for its manufacture. One embodiment of the battery may include a three-dimensionally structured thin film solid state battery having interdigitated cathode and anode volumes, which are separated by an electrolyte material. In an example method, a cathode current collector layer and an anode current collector layer may be formed on a substrate. The cathode current collector layer and the anode current collector layer may include a cathode current collector area and an anode current collector area, respectively. A cathode layer may be formed on the cathode current collector layer and an anode layer may be formed on the anode current collector layer. An electrolyte layer may be formed on the substrate. The electrolyte layer may include an electrolyte area, which separates the anode current collector area and the cathode current collector area.

18 Claims, 10 Drawing Sheets

3D-STRUCTURED SOLID STATE BATTERY

BACKGROUND

Thin film solid state batteries have emerged as a possible alternative to conventional lithium-ion batteries. In some cases, thin film solid state batteries may have similar voltage and current characteristics as their conventional counterparts, but with improved energy density and reduced bulk and weight. Such characteristics may be important as the number of mobile computing devices and implantable medical devices continues to grow.

SUMMARY

A battery may be formed in a three-dimensional manner by selective patterning of current collectors, cathode, anode, and electrolyte materials on a substrate. For example, anode and cathode materials and their respective current collectors may be arranged in an interdigitated finger geometry with the anode and cathode volumes being separated by the electrolyte material. By structuring the battery in such a manner, various characteristics of the battery may be improved. For example, the cathode efficiency may be improved for a given cathode thickness. Other improvements may be possible, such as increased integration with existing device manufacturing processes.

In a first aspect, a battery is provided. The battery includes a substrate, a cathode current collector, an anode current collector, a cathode, an anode, and an electrolyte. The cathode current collector includes a cathode current collector area. The cathode current collector is disposed on the substrate. The anode current collector includes an anode current collector area. The anode current collector is disposed on the substrate. The cathode is disposed on the cathode current collector. The anode is disposed on the anode current collector. The electrolyte includes an electrolyte area. The electrolyte is disposed on the substrate. The anode current collector area is separated from the cathode current collector area by at least the electrolyte area.

In a second aspect, a method is provided. The method includes providing a substrate. The method further includes forming a cathode current collector layer on the substrate. The cathode current layer includes a cathode current collector area. The method also includes forming an anode current collector layer on the substrate. The anode current collector layer includes an anode current collector area. The method yet further includes forming a cathode layer on the cathode current collector area. The method additionally includes forming an anode layer on the anode current collector layer. The method further includes forming an electrolyte layer on the substrate. The electrolyte layer includes an electrolyte area. The anode current collector area is separated from the cathode current collector area by at least the electrolyte area.

In a third aspect, a method is provided. The method includes depositing a current collector on a substrate. The method further includes selectively removing a portion of the current collector. A remaining portion of the current collector includes a plurality of anode finger areas and a plurality of cathode finger areas. The anode finger areas and the cathode finger areas are separated by an interstitial area. The method also includes depositing an electrolyte on the substrate. The method additionally includes selectively removing a portion of the electrolyte. A remaining portion of the electrolyte includes the electrolyte disposed proximate to the interstitial area. The method yet further includes depositing an anode on the current collector. The method includes selectively removing a portion of the anode. A remaining portion of the anode includes the anode disposed proximate to the plurality of anode finger areas. The method also includes depositing a cathode on the current collector and selectively removing a portion of the cathode. A remaining portion of the cathode includes the cathode disposed proximate to the plurality of cathode finger areas.

Other aspects, embodiments, and implementations will become apparent to those of ordinary skill in the art by reading the following detailed description, with reference where appropriate to the accompanying drawings.

DETAILED DESCRIPTION

I. Overview

A battery and a method of manufacturing the battery may be disclosed herein. Namely, the battery may be a thin film solid state battery. Cathode materials of such a thin film solid state battery may include metal oxides such as lithium cobalt oxide ($LiCoO_2$ or LCO). Other cathode materials may include lithium manganese oxide (LMO), lithium iron phosphate (LFP), or lithium nickel manganese cobalt oxide (NMC). The cathode materials may be deposited in various ways, including pulsed laser deposition (PLD), magnetron sputtering, physical vapor deposition (PVD) and chemical vapor deposition (CVD). Anode materials of the thin film solid state battery may include lithium metal. Other anode materials are possible.

Current collectors of batteries disclosed herein may include a low-resistance material such a metal. Alternatively or additionally, current collectors may include graphene, carbon nanotubes, silver nanowires, or other materials.

Example embodiments include an electrolyte, which may allow and/or regulate ion conduction between the cathode and anode. The electrolyte may include an inorganic solid-state material such as lithium phosphorous oxynitride (LiPON). In some embodiments, the LiPON may be deposited by RF magnetron sputtering or PVD. For example, PVD of LiPON may include exposing a target of lithium phosphate to plasma in a nitrogen environment. Alternatively or additionally, the electrolyte may include a different material. The electrolyte may be able to conform to a shape of the underlying layers.

In an example embodiment, the aforementioned elements of the thin film solid state battery may be patterned, removed, and/or deposited in a selective manner. That is, the materials need not be deposited in a blanket layer across an entire area of a given substrate. Instead, the respective materials may be deposited and/or formed in selected areas of the substrate in an additive or subtractive fashion. Alternatively, the materials may be deposited in a blanket layer fashion and then selectively removed using various techniques such as photolithography and laser scribing.

Using selective deposition techniques, a thin film solid state battery may be patterned in three-dimensions. In some embodiments, such 3D patterning may improve performance of the battery by, for instance, having more cathode volume and/or more electrolyte surface area. Further, such an approach may increase battery capacity by improving cathode efficiency. Example embodiments may improve other characteristics of the battery. For example, the batteries may be customized to fit into a particular form factor, an area and/or a volume. Furthermore, such techniques may offer integration with conventional integrated circuit manufacturing processes, which may enable on-chip battery integration.

II. Example Batteries

Figure 1A:
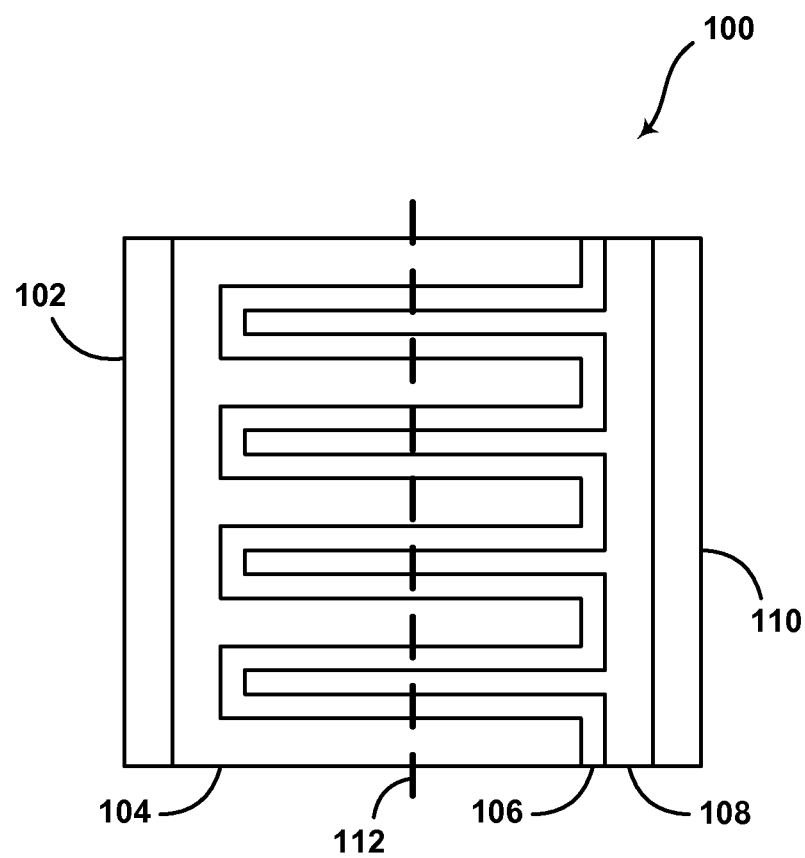
FIG. 1A illustrates a view of a battery, according to an example embodiment.

FIG. 1A illustrates a view of a battery 100, according to an embodiment. The battery 100 may be a thin film solid state battery and may include a cathode current collector 102 and a cathode 104. The battery 100 may further include an electrolyte 106. The battery 100 may additionally include an anode 108 and an anode current collector 110.

The cathode current collector 102 and the anode current collector 110 may include a material that functions as an electrical conductor. Furthermore, the cathode current collector 102 and the anode current collector 110 may be configured to be block lithium ions and various oxidation products ($H_2O$, $O_2$, $N_2$, etc.). In other words, the cathode current collector 102 and the anode current collector 110 may include materials that have minimal reactivity with lithium. For example, the cathode current collector 102 and the anode current collector 110 may include one or more of: Au, Ag, Al, Cu, Co, Ni, Pd, Zn, and Pt. Alloys of such materials are also contemplated herein. In some embodiments, an adhesion layer material, such as Ti may be utilized. In other words, the current collectors may include multiple layers, e.g. TiPtAu. Other materials are possible to form the cathode current collector 102 and the anode current collector 110. For example, the cathode current collector 102 and/or the anode current collector 110 may be formed from carbon nanotubes and/or metal nanowires.

The cathode current collector 102 and the anode current collector 110 may be deposited using RF or DC sputtering of source targets. Alternatively, PVD, electron beam-induced deposition or focused ion beam deposition may be utilized to form the cathode current collector 102 and the anode current collector 110.

In some embodiments, the cathode current collector 102 and the anode current collector 110 may be formed by depositing a blanket material layer on a substrate. The blanket material layer may subsequently be patterned, for example by a masking and etching method. Alternatively, the blanket material layer may be patterned by ablating selected areas using a laser.

In other embodiments, the cathode current collector 102 and the anode current collector 110 may be formed on the substrate by depositing through a hard shadow mask and/or a photolithography-defined resist mask. Alternatively, the cathode current collector 102 and the anode current collector 110 may be deposited in separate steps using multiple masks. Other ways to define the current collectors are contemplated within the scope of the present disclosure.

The cathode 104 may include a material such as lithium cobalt oxide ($LiCoO_2$, or LTO). Additionally or alternatively, the cathode 104 may include lithium manganese oxide ($LiMn_2O_4$, or LMO), lithium nickel manganese cobalt oxide ($LiNi_xMn_yCo_zO_2$, or NMC), or lithium iron phosphate ($LiFePO_4$). Other cathode materials are possible. Furthermore, the cathode may be coated with aluminum oxide and/or another ceramic material, which may allow the battery to operate at higher voltages and/or provide other performance advantages.

In example embodiments, LTO may be deposited using RF sputtering or PVD, however other deposition techniques may be used to form the cathode 104. The deposition of the cathode 104 may occur as a blanket over the entire substrate. A subtractive process of masking and etching may remove cathode material where unwanted. Alternatively, the deposition of the cathode 104 may be masked using a photolithography-defined resist mask. In an example embodiment, the cathode current collector 102 is deposited through a shadow mask onto the substrate. Subsequently, the material of the cathode 104 may be deposited through an identical or similar shadow mask onto the cathode current collector 102.

The anode 108 may include a material such as lithium metal. Additionally or alternatively, the anode 108 may include lithium titanate ($Li_4Ti_5O_{12}$). Li-free anode materials such as graphite, carbon, silicon, or other solid state battery anode materials are also contemplated herein. The material of anode 108 may be deposited using evaporation, sputtering, or other deposition techniques.

The anode 108 may be selectively formed on the substrate in different ways. For example, the material of anode 108 may be deposited as a blanket over the entire substrate and selectively etched or otherwise removed. Alternatively, the anode material may be masked during deposition. In an example embodiment, the anode current collector 110 is deposited through a shadow mask onto the substrate. Subsequently, the material of the anode 108 is deposited through an identical or similar shadow mask onto the anode current collector 110.

The electrolyte 106 may be disposed between the cathode 104 and the anode 108. The electrolyte 106 may include a material such as lithium phosphorous oxynitride (LiPON). Additionally or alternatively, the electrolyte 106 may include a flexible polymer electrolyte material. Generally, the electrolyte 106 may be configured to permit ion conduction between the anode 108 and the cathode 104. In an example embodiment, the LiPON material may allow lithium ion transport while preventing a short circuit between the anode 108 and the cathode 104.

As shown in FIG. 1A, the cathode 104 and the anode 108 may include respective finger portions. The respective finger portions may be substantially interdigitated. That is, at least some of the cathode fingers may be substantially disposed between at least some of the anode fingers, and vice versa. Other geometric arrangements of the cathode 104, anode 108, and their respective current collectors are possible. For example, the cathode 104 and anode 108 may include respective finger volumes disposed in a similar interdigitated manner. Additionally or alternatively, the cathode 104 and anode 108 may be configured to increase or maximize diffusion area between a portion of cathode 104, the electrolyte 106, and an adjacent or nearest-neighbor portion of anode 108.

It should be understood that FIG. 1A illustrates the battery 100 in a "single cell" configuration and that other configurations are possible. For example, the battery 100 may be connected in a parallel and/or series configuration with similar or different batteries or circuits. In other words, several instances of battery 100 may be connected in series to in an effort to increase the open circuit voltage of the battery, for instance. Similarly, several instances of battery 100 may be connected in parallel to increase capacity (amp hours). In other embodiments, battery 100 may be connected in configurations involving other batteries. In an example embodiment, a plurality of instances of battery 100 may be configured in a planar array on the substrate. Other arrangements are possible.

Figure 1B:
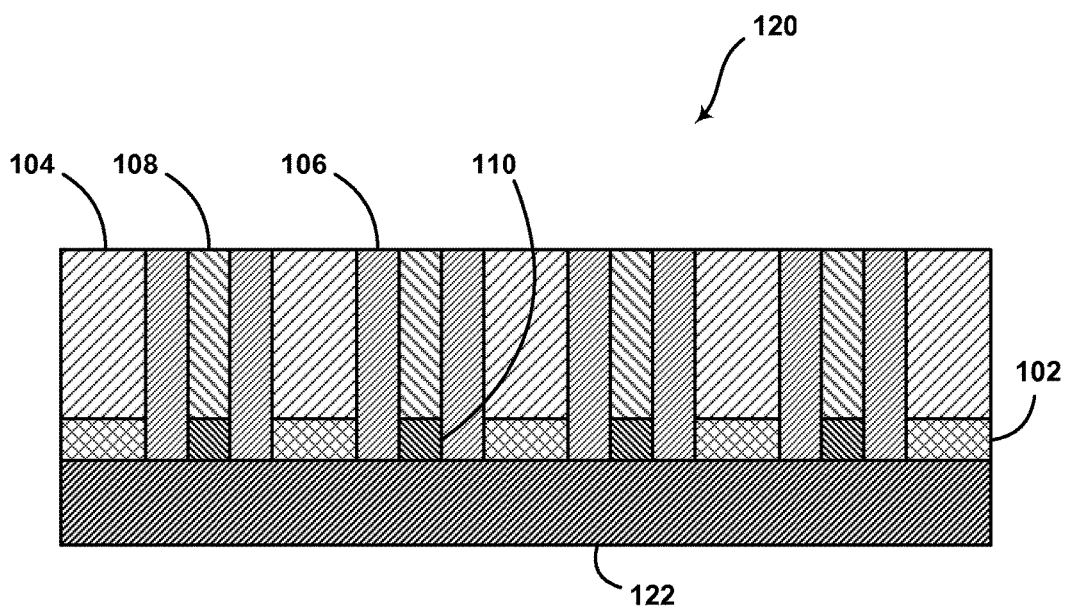
FIG. 1B illustrates a cross-sectional view of a battery, according to an example embodiment.

FIG. 1B illustrates a cross-sectional view of a battery 120, according to an embodiment. Battery 120 may be similar or identical to battery 100 as illustrated and described in reference to FIG. 1A. For example, battery 120 may include a cathode 104, an anode 108, an electrolyte 106, an anode current collector 110, and a cathode current collector 102. Furthermore, battery 120 may include a substrate 122. The cross-sectional view of battery 120 may be a cross-section of battery 100 along section 112 as illustrated in reference to FIG. 1A.

Substrate 122 may include a variety of materials. For example, substrate 122 may include one or more of: a silicon wafer, a plastic, a polymer, paper, fabric, glass, or a ceramic material. Other materials for substrate 122 are contemplated herein. Generally, substrate 122 may include any solid or flexible material that is sufficiently insulating so as to prevent a short circuit between the anode current collector 110 and the cathode current collector 102.

As described in reference to FIG. 1A, cathode 104 and anode 108 may include respective finger portions that are interdigitated with respect to one another. The electrolyte 106 may be disposed on the substrate 122 between the anode 108 and the cathode 104. Other geometries are possible. Furthermore, while FIG. 1B may illustrate a particular geometric arrangement of the various elements of battery 120, it should be understood that an as-fabricated cross-section may appear different due to, for instance, deposition profiles and shadow mask limitations.

Figure 1C:
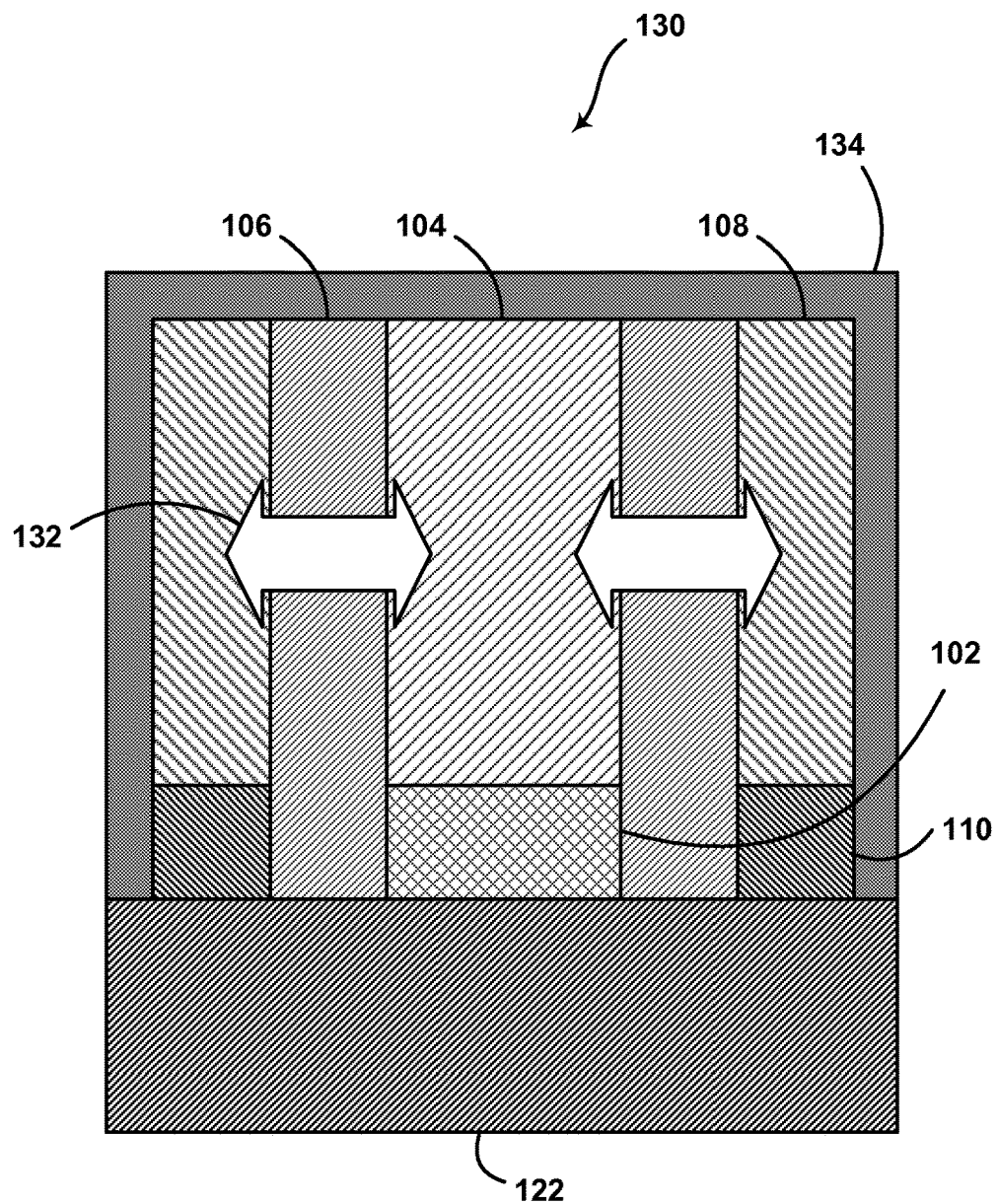
FIG. 1C illustrates a cross-sectional view of a battery, according to an example embodiment.

FIG. 1C illustrates a cross-sectional view of a battery 130, according to an embodiment. Battery 130 may be similar or identical in various aspects to battery 100 and battery 120 as illustrated and described in relation to FIGS. 1A and 1B, respectively. Namely, battery 130 may include a cathode 104, an anode 108, an electrolyte 106, a cathode current collector 102, an anode current collector 110, and a substrate 122. As described above, electrolyte 106 may be configured to allow ion transport 132 between cathode 104 and anode 108.

In some embodiments, battery 130 may include an encapsulation 134. The encapsulation 134 may include a material configured to protect and stabilize the underlying elements of battery 130. For example, the encapsulation 134 may include an inert material, an insulating material, a passivating material, and/or a physically- and/or chemically-protective material. In an embodiment, the encapsulation 134 may include a multilayer stack which may include alternating layers of a polymer (e.g. parylene, photoresist, etc.) and a ceramic material (e.g. alumina, silica, etc.) Additionally or alternatively, the encapsulation 134 may include silicon nitride (SiN). Encapsulation 134 may include other materials.

In an example embodiment, battery 130 may occur in a stacked arrangement. That is, instances of battery 130 may be placed on top of one another. The encapsulation 134 may provide a planarization layer for a further substrate 122 and accompanying battery materials. Alternatively, the battery materials may be patterned directly on the encapsulation 134 without a further substrate 122. In such a way, multiple instances of battery 130 may be formed on top of one another.

III. Example Methods

Figure 2:
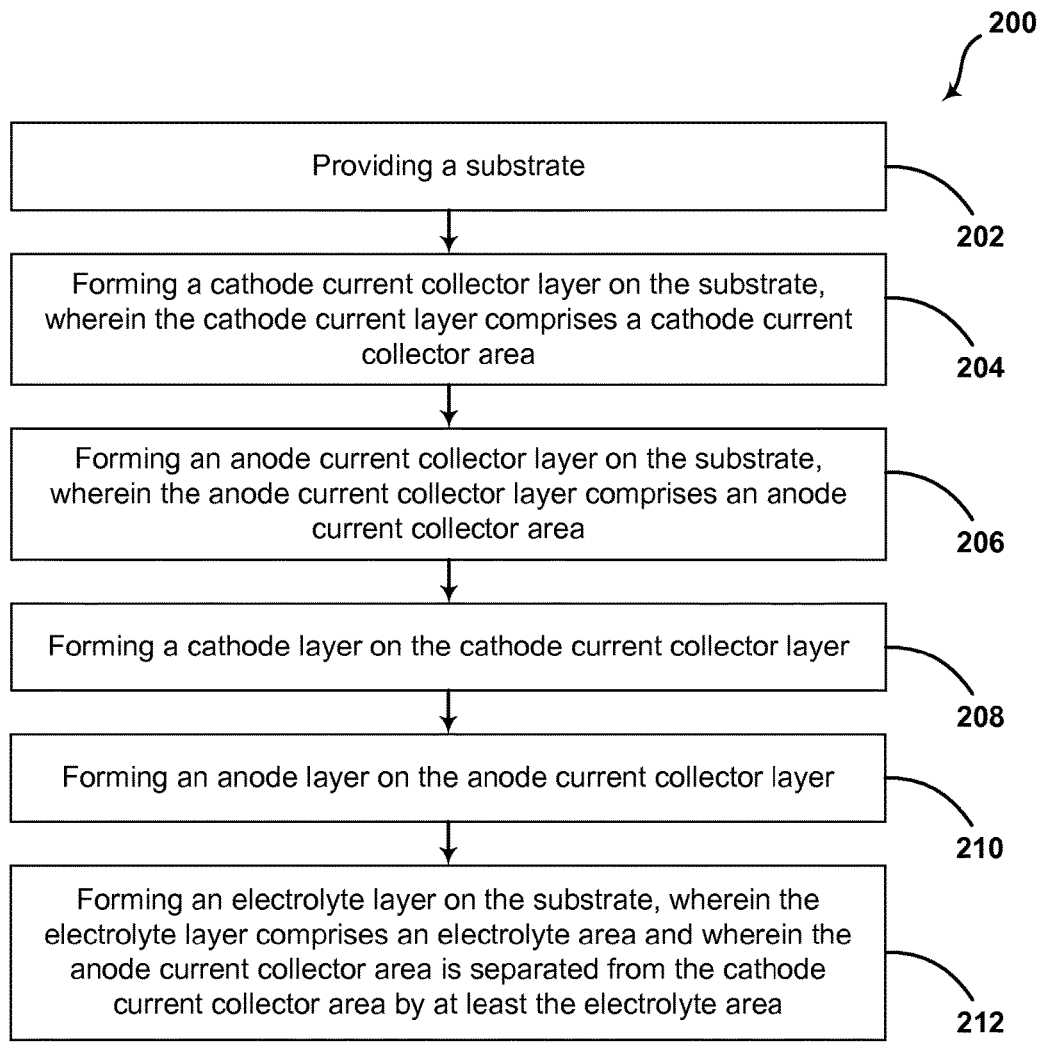
FIG. 2 illustrates a method, according to an example embodiment.

FIG. 2 illustrates a method 200, according to an embodiment. The method may include various blocks or steps. The blocks or steps may be carried out individually or in combination. The blocks or steps may be carried out in any order and/or in series or in parallel. Further, blocks or steps may be omitted or added to method 200.

The blocks of method 200 may be carried out to form or compose the elements of batteries 100, 120, and 130 as illustrated and described in reference to FIGS. 1A-C.

Block 202 includes providing a substrate. As described above, the substrate may include a solid or flexible material. The substrate may be insulating so as to prevent a short circuit.

Block 204 includes forming a cathode current collector layer on the substrate. The cathode current collector includes a cathode current collector area. The cathode current collector may include a metal and may be 200-1000 nanometers thick. Other materials and thicknesses are possible.

Block 206 includes forming an anode current collector layer on the substrate. The anode current collector includes an anode current collector area. The anode current collector may include a metal and may be 200-1000 nanometers thick. Other materials and thicknesses are possible.

Block 208 includes forming a cathode layer on the cathode current collector layer. In some embodiments, the cathode layer may include lithium cobalt oxide ($LiCoO_2$). In some embodiments, the cathode current collector area may include a plurality of cathode finger areas. The cathode finger areas may include a cathode finger width of about 10 microns, however other widths are possible. The cathode layer thickness may vary between 10-30 microns, although other thicknesses are possible. Forming the cathode layer on the cathode current collector layer may include depositing the LCO material through a shadow mask using physical vapor deposition. Alternatively, the LCO material may be formed in a blanket on the substrate and then subsequently removed with a suitable etch or ablation. In yet further embodiments, a photolithography mask may be applied before or after the cathode material deposition. In such a fashion, the cathode material may be patterned using additive or subtractive fabrication techniques.

Block 210 includes forming an anode layer on the anode current collector layer. In an example embodiment, the anode layer may include lithium metal (Li). The anode current collector area may include a plurality of anode finger areas. The anode finger areas may include an anode finger width of about 2 microns. However, other anode finger widths are possible. Furthermore, the anode layer thickness may be between 10-30 microns, but other anode layer thicknesses are possible. The anode material may be deposited using sputtering techniques or PVD, although other deposition methods are possible.

Block 212 includes forming an electrolyte layer on the substrate. The electrolyte layer includes an electrolyte area. The anode current collector area is separated from the cathode current collector area by at least the electrolyte area. In an example embodiment, the electrolyte layer may include lithium phosphorous oxynitride (LiPON). Furthermore, the electrolyte area may include an interstitial electrolyte area with an electrolyte width of about 10 microns. The electrolyte layer thickness may vary between 10-30 microns, however other electrolyte layer thicknesses are possible. The electrolyte layer may be formed using a magnetron sputtering system or PVD.

In an example embodiment, the respective cathode and anode finger areas may be interdigitated. In other words, at least some of the anode finger areas may be disposed between at least some of the cathode finger areas. In such embodiments, the interstitial electrolyte area may separate the anode finger areas and the cathode finger areas.

In some embodiments, an encapsulation layer may be formed over at least the cathode layer, the anode layer, and the electrolyte layer. The encapsulation layer may include an inert and/or passivating material, such as silicon nitride (SiN). In an example embodiment, the encapsulation layer may be about 1 micron thick.

While some embodiments described herein may include additive deposition techniques (e.g. blanket deposition, shadow-masked deposition, selective deposition, etc.), subtractive patterning techniques are possible. Subtractive patterning may include material removal after deposition onto the substrate or other elements of the battery. In an example embodiment, a blanket deposition of material may be followed by a photolithography process (or other type of lithography technique) to define an etch mask. The etch mask may include photoresist and/or another material such as silicon dioxide ($SiO_2$) or another suitable masking material.

The subtractive patterning process may include an etching process. The etch process may utilize physical and/or chemical etching of the battery materials. Possible etching techniques may include reactive ion etching, wet chemical etching, laser scribing, electron cyclotron resonance (ECR-RIE) etching, or another etching technique.

In some embodiments, material liftoff processes may be used. In such a scenario, a sacrificial mask or liftoff layer may be patterned on the substrate before material deposition. After material deposition, a chemical process may be used to remove the sacrificial liftoff layer and battery materials that may have deposited on the sacrificial liftoff layer. In an example embodiment, a sacrificial liftoff layer may be formed using a negative photoresist with a reentrant profile. That is, the patterned edges of the photoresist may have a cross-sectional profile that curves inwards towards the main volume of photoresist. Materials may be deposited to form, for instance, the anode and cathode current collectors. Thus, material may be directly deposited onto the substrate in areas where there is no photoresist. Additionally, the material may deposited onto the patterned photoresist. Subsequently, the photoresist may be removed using a chemical, such as acetone. In such a fashion, the current collector material may be "lifted off" from areas where the patterned photoresist had been. Other methods of sacrificial material removal are contemplated herein.

Figure 3:
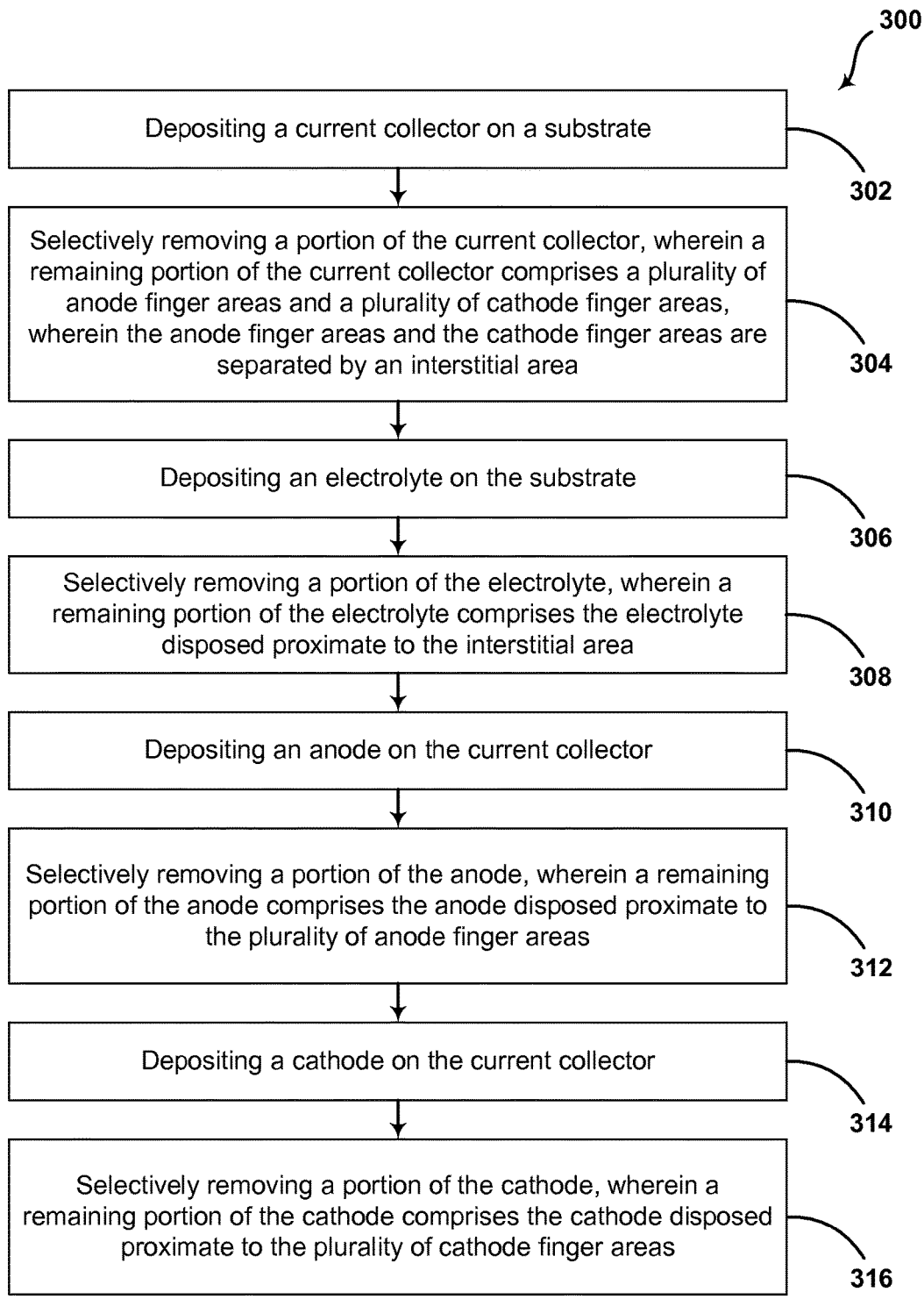
FIG. 3 illustrates a method, according to an example embodiment.

FIG. 3 illustrates a method 300, according to an embodiment. The method may include various blocks or steps. The blocks or steps may be carried out individually or in combination. The blocks or steps may be carried out in any order and/or in series or in parallel. Further, blocks or steps may be omitted or added to method 300.

The blocks of method 300 may be carried out to form or compose the elements of batteries 100, 120, and 130 as illustrated and described in reference to FIGS. 1A-C.

Block 302 includes depositing a current collector on a substrate. The current collector may include a metal and may be 200-1000 nanometers thick. Other materials and thicknesses for the current collector are possible. Block 304 includes selectively removing a portion of the current collector. A remaining portion of the current collector includes a plurality of anode finger areas and a plurality of cathode finger areas. The anode finger areas and the cathode finger areas are separated by an interstitial area.

Block 306 includes depositing an electrolyte on the substrate. Block 308 includes selectively removing a portion of the electrolyte. A remaining portion of the electrolyte includes the electrolyte disposed proximate to the interstitial area. The electrolyte may include lithium phosphorous oxynitride (LiPON). The electrolyte may be disposed on the interstitial electrolyte area, which may include an electrolyte width of about 10 microns. In some embodiments, the electrolyte may be between 10-30 microns thick. Other thicknesses and widths of the electrolyte are possible. The electrolyte may be formed using a physical vapor deposition (PVD) system, but other deposition methods are contemplated herein.

Block 310 includes depositing an anode on the current collector. Block 312 includes selectively removing a portion of the anode. A remaining portion of the anode includes the anode disposed proximate to the plurality of anode finger areas. An anode finger width may be about 2 microns. In some embodiments, the anode may include lithium metal (Li) and may range in thickness from 10-30 microns or more. Other anode materials and/or finger dimensions are possible.

Block 314 includes depositing a cathode on the current collector. Block 316 includes selectively removing a portion of the cathode. A remaining portion of the cathode includes the cathode disposed proximate to the plurality of cathode finger areas. The cathode finger area may include a cathode finger width of 10 microns. The cathode finger width may alternatively be another width. The cathode may include lithium cobalt oxide ($LiCoO_2$). The thickness of the cathode may vary between 10-30 microns thick, or more. Other cathode materials and/or finger dimensions are possible.

Method 300 may optionally include forming an encapsulation layer over at least the cathode, the anode, and the electrolyte. The encapsulation layer may be about 1 micron thick, however other thicknesses of the encapsulation layer are contemplated. The encapsulation layer may include a multilayer stack, which may include a plurality of layers. The plurality of layers may include at least one of a polymer material and a ceramic material. For example, the encapsulation layer may include a photoresist layer and an alumina layer deposited in an alternating multi-layer fashion.

Selectively removing a portion of any of the current collector, electrolyte, anode, or cathode may include laser-scribing the respective portion of the collector, electrolyte, anode, and cathode. That is, a blanket layer of the current collector, electrolyte, anode, and/or cathode material may be deposited. Subsequently, a laser scribe may remove portions of the respective materials. The laser scribe may include a high-power laser configured to ablate or otherwise remove material from a surface. The laser light may be directed by an optical system according to a predetermined scribing pattern or mask pattern. Each of the current collector, electrolyte, anode, and cathode may have an associated mask pattern to define the material to remove (and preserve) using laser scribing.

Other methods of selectively patterning each of the current collector, electrolyte, anode, and cathode materials are contemplated. For instance, photoresist may be deposited on the substrate. The photoresist may be exposed, developed, and patterned using a photomask. Subsequently, one of the current collector, electrolyte, anode, or cathode may be deposited on the patterned photoresist. Portions of the respective current collector, electrolyte, anode, or cathode may be removed through a "lift off" process where the underlying photoresist is dissolved in a solvent such as acetone or photoresist stripper. Other selective patterning techniques are considered within the scope of the disclosure.

Figure 4A:
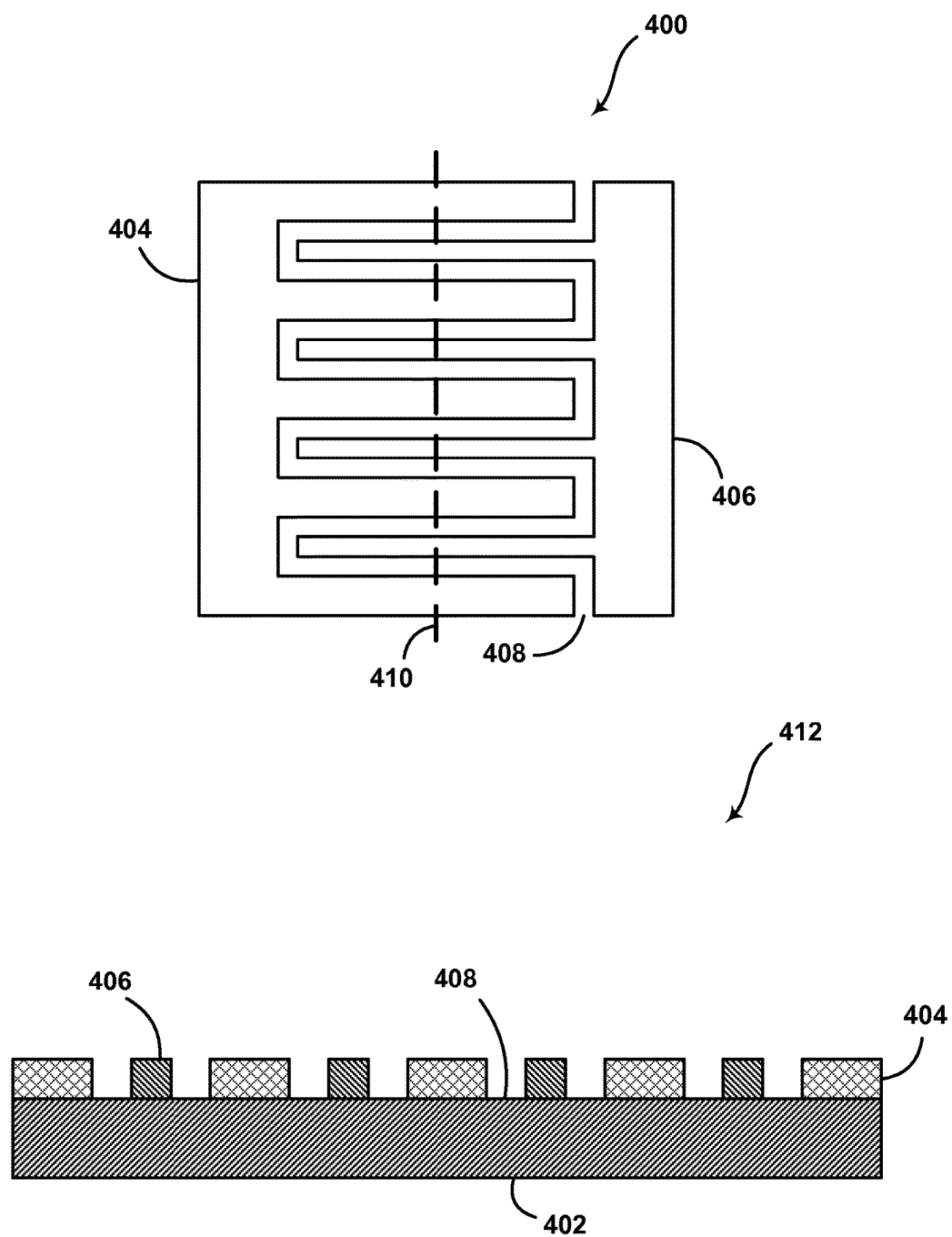
FIG. 4A illustrates battery manufacturing scenario, according to an example embodiment.

FIGS. 4A-4D illustrate several battery manufacturing scenarios, according to example embodiments. The figures include a top view and an associated cross-sectional view based on cross-sectional plane 410. FIG. 4A illustrates battery 400 following patterning of the current collector layer. Battery 400 includes a cathode current collector 404 and an anode current collector 406. Battery 400 also includes an interstitial area 408.

Cross-sectional view 412 includes substrate 402.

Figure 4B:
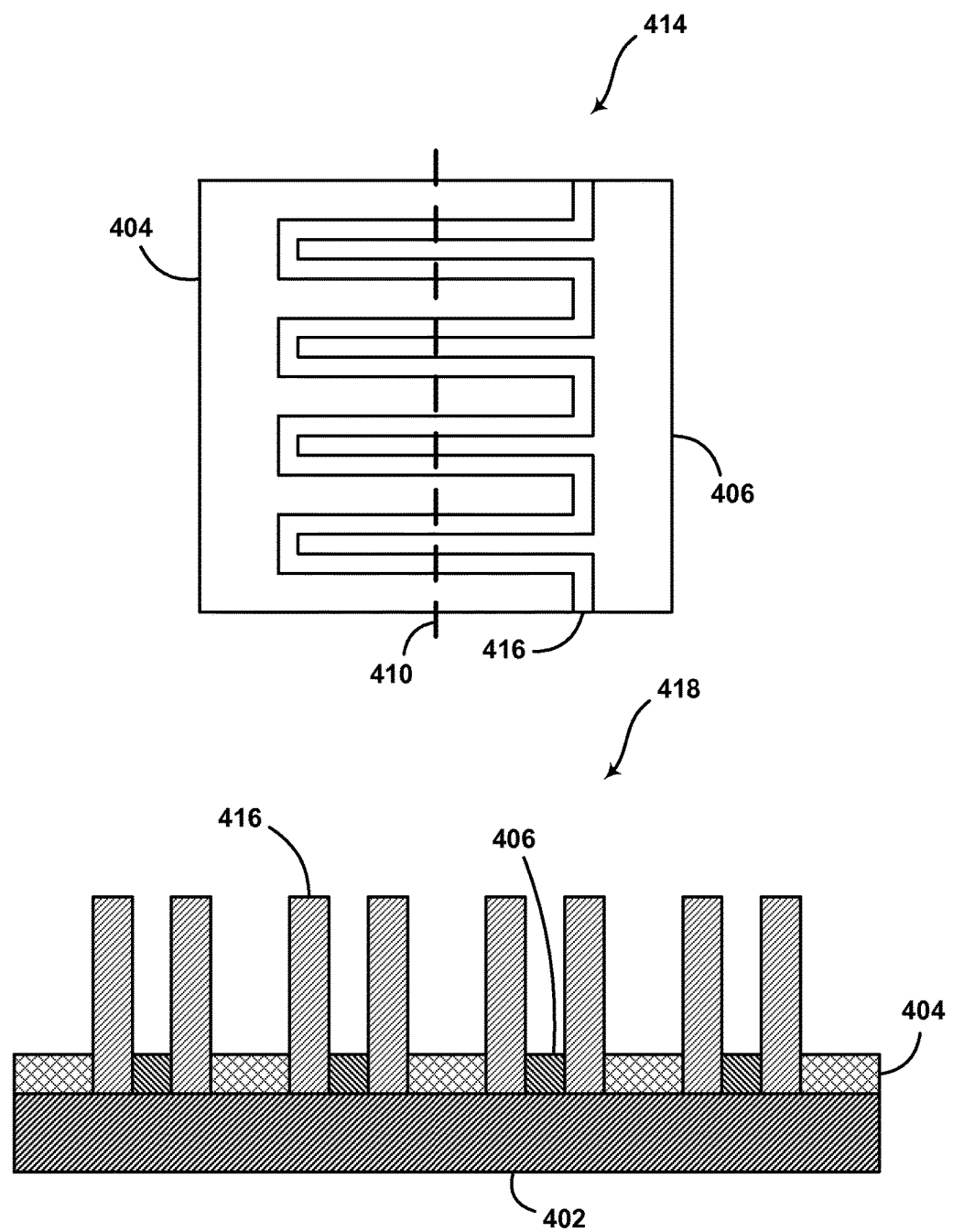
FIG. 4B illustrates battery manufacturing scenario, according to an example embodiment.

FIG. 4B illustrates battery 414 following patterning of the electrolyte 416. Specifically, electrolyte 416 may be deposited on the interstitial area 408.

Figure 4C:
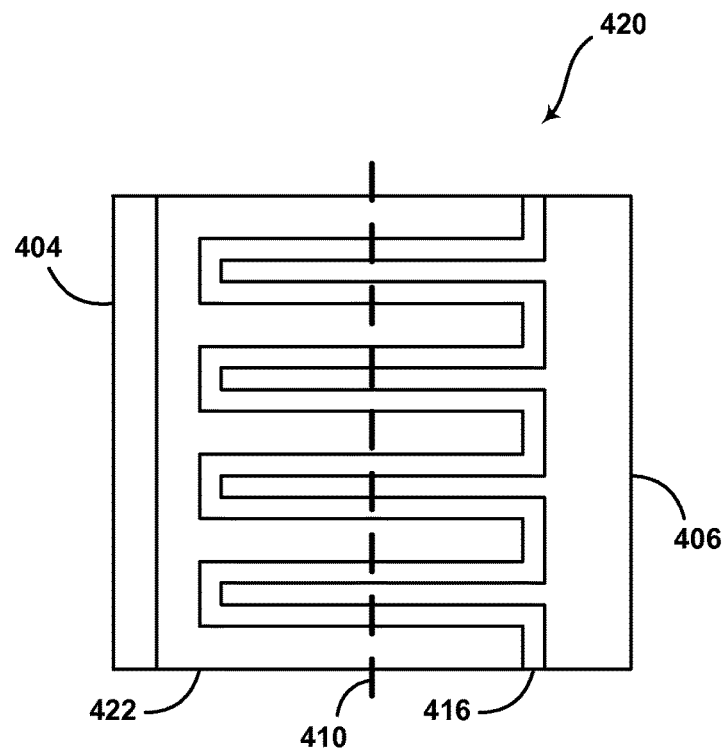
FIG. 4C illustrates battery manufacturing scenario, according to an example embodiment.
Figure 4C:
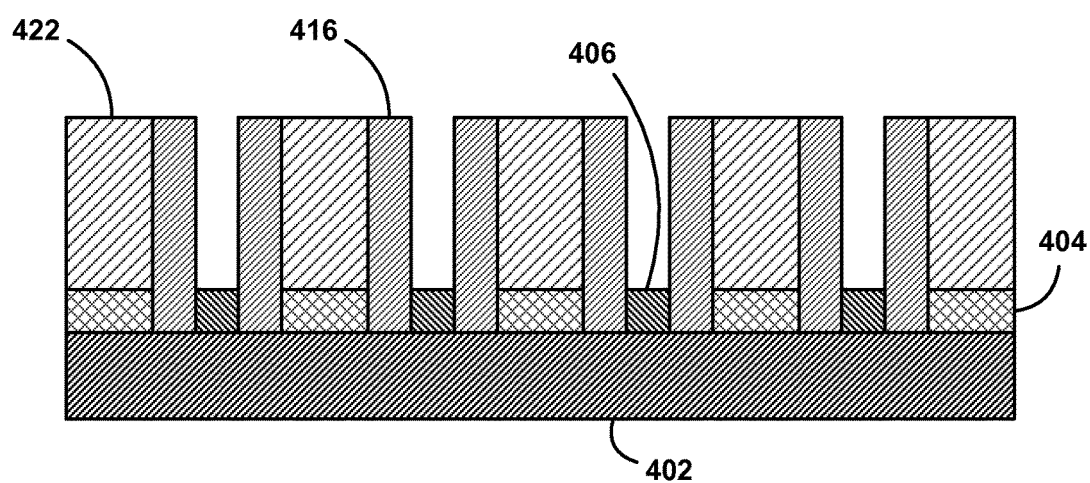
Figure 4D:
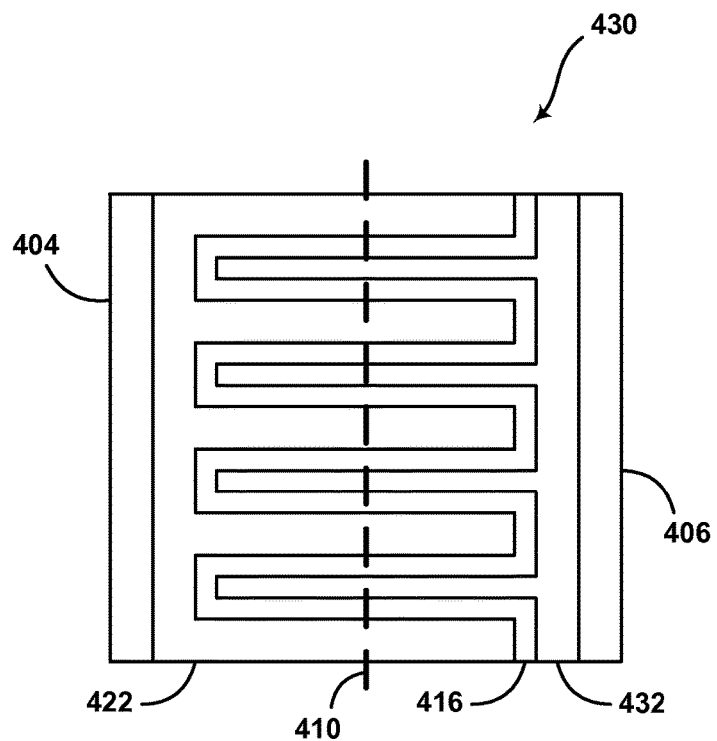
FIG. 4D illustrates battery manufacturing scenario, according to an example embodiment.
Figure 4D:
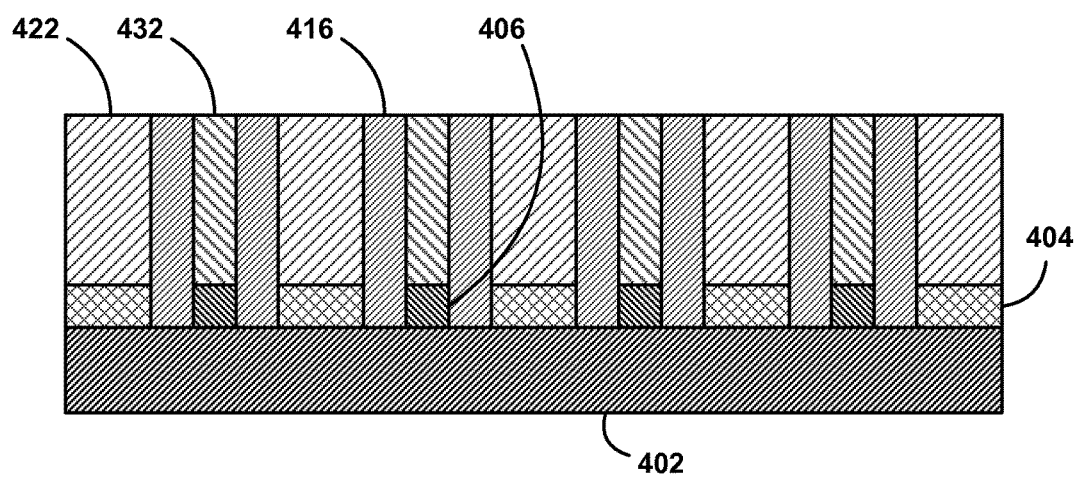

FIG. 4C illustrates battery 420 after selective formation of cathode 422. FIG. 4D illustrates battery 430 after selective formation of the anode 432.

Figure 4E:
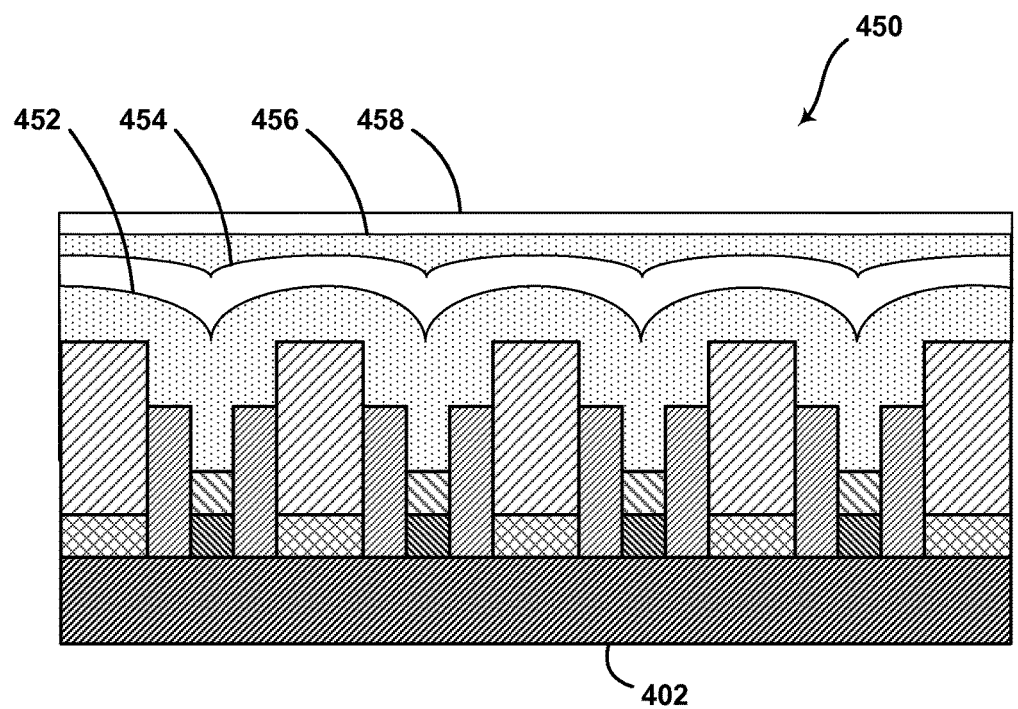
FIG. 4E illustrates a battery with an encapsulation layer.

FIG. 4E illustrates a battery 450 with an encapsulation layer. The encapsulation layer may include a multilayer stack. The multilayer stack may include polymer material layers 452 and 456. The multilayer stack may further include ceramic material layers 454 and 458. One result of the encapsulation layer is that it may planarize the battery assembly. That is, the various as-manufactured elements of the battery may include different vertical heights. For example, the cathode may be about 20 microns thick, the anode may be about 18 microns thick, and the electrolyte may be about 19 microns thick. This "surface topography", which is exaggerated for illustrative purposes in FIG. 4E, may be reduced or eliminated by the deposition of the multiple layers of the multilayer stack. The encapsulation may also act as a moisture barrier and/or an insulating layer. Furthermore, the encapsulation layer may form the base of another battery formed on top of the multilayer stack. In other words, multiple instances of battery 450 may be stacked on top of one another.

IV. Conclusion

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various examples and embodiments have been disclosed, other examples and embodiments will be apparent to those skilled in the art. The various disclosed examples and embodiments are for purposes of illustration and are not intended to be limiting, with the true scope and spirit being indicated by the following claims.

What is claimed is:

1. A system comprising:
   a substrate;
   a cathode current collector, wherein the cathode current collector comprises a cathode current collector area, wherein the cathode current collector is disposed on the substrate, and wherein the cathode current collector area comprises a plurality of cathode finger areas;
   an anode current collector, wherein the anode current collector comprises an anode current collector area, wherein the anode current collector is disposed on the substrate, wherein the anode collector area comprises a plurality of anode finger areas, wherein the cathode finger widths are at least five times as wide as the anode finger widths, and wherein the plurality of anode finger areas are substantially interdigitated with the cathode finger areas;
   a cathode, wherein the cathode is disposed on the cathode current collector;
   an anode, wherein the anode is disposed on the anode current collector;
   an electrolyte, wherein the electrolyte comprises an electrolyte area, wherein the electrolyte is disposed on the substrate, and wherein the anode current collector area is separated from the cathode current collector area by at least the electrolyte area
   an encapsulation layer disposed over at least the cathode layer, the anode layer, and the electrolyte layer; and
   a second current collector disposed on the encapsulation layer.

2. The system of claim 1 wherein the cathode further comprises at least one of lithium cobalt oxide ($LiCoO_2$) and lithium nickel manganese cobalt oxide ($LiNi_xMn_yCo_zO_2$, NMC).

3. The system of claim 1 wherein the electrolyte comprises lithium phosphorous oxynitride (LiPON).

4. The system of claim 1 wherein the anode comprises lithium metal (Li).

5. The system of claim 1 wherein the anode current collector and the cathode current collector comprise at least one of a metal, carbon nanotubes, and metal nanowires.

6. The system of claim 1, wherein the encapsulation layer comprises a multilayer stack, wherein the encapsulation layer is about 1 micron thick, and wherein the multilayer stack comprises a plurality of layers comprising at least one of a polymer material and a ceramic material.

7. A method comprising:
   providing a substrate;
   forming a cathode current collector layer on the substrate, wherein the cathode current layer comprises a cathode current collector area, and wherein the current collector area comprises a plurality of cathode finger areas having cathode finger widths;
   forming an anode current collector layer on the substrate, wherein the anode current collector layer comprises an anode current collector area, wherein the anode collector area comprises a plurality of anode finger areas having anode finger widths, wherein the cathode finger widths are at least five times as wide as the anode finger widths, and wherein the plurality of anode finger areas are substantially interdigitated with the cathode finger areas;
   forming a cathode layer on the cathode current collector layer;
   forming an anode layer on the anode current collector layer; and forming an electrolyte layer on the substrate, wherein the electrolyte layer comprises an electrolyte area, and wherein the anode current collector area is separated from the cathode current collector area by at least the electrolyte area;

forming an encapsulation layer over at least the cathode layer, the anode layer, and the electrolyte layer; and depositing a second current collector on the encapsulation layer.

8. The method of claim 7 wherein the electrolyte layer comprises lithium phosphorous oxynitride (LiPON), wherein the electrolyte area comprises an interstitial electrolyte area, wherein the interstitial electrolyte area comprises an electrolyte width of about 10 microns, and wherein forming the electrolyte layer comprises forming the electrolyte layer with a physical vapor deposition (PVD) system.

9. The method of claim 7 wherein the cathode layer comprises at least one of lithium cobalt oxide (LiCoO$_2$) and lithium nickel manganese cobalt oxide (LiNi$_x$Mn$_y$Co$_z$O$_2$, NMC), wherein the cathode finger areas comprise a cathode finger width of about 10 microns, wherein the anode layer comprises lithium metal (Li), and wherein the anode finger areas comprise an anode finger width of about 2 microns.

10. The method of claim 7, wherein the encapsulation layer comprises a multilayer stack, wherein the encapsulation layer is about 1 micron thick, wherein the multilayer stack comprises a plurality of alternating layers, and wherein the alternating layers comprise a polymer material and a ceramic material.

11. A method comprising:
forming a current collector on a substrate, wherein the current collector comprises an anode current collector and a cathode current collector, wherein the anode current collector comprises a plurality of anode finger areas having anode finger widths, wherein the cathode current collector comprises a plurality of cathode finger areas having cathode finger widths, wherein the anode finger areas and the cathode finger areas are separated by an interstitial electrolyte area, wherein the cathode finger widths are at least five times as wide as the anode finger widths, and wherein the plurality of anode finger areas are substantially interdigitated with the cathode finger areas;

forming an electrolyte on the substrate, wherein a portion of the electrolyte is disposed proximate to the interstitial electrolyte area;

forming an anode on the anode current collector;

forming a cathode on the cathode current collector;

forming an encapsulation layer over at least the cathode layer, the anode layer, and the electrolyte layer; and depositing a second current collector on the encapsulation layer.

12. The method of claim 11 wherein the cathode comprises lithium cobalt oxide (LiCoO$_2$) and wherein the cathode finger area comprises a cathode finger width of about 10 microns.

13. The method of claim 11 wherein the anode comprises lithium metal (Li) and wherein the anode finger area comprises an anode finger width of about 2 microns.

14. The method of claim 11 wherein the electrolyte comprises lithium phosphorous oxynitride (LiPON), wherein the interstitial electrolyte area comprises an electrolyte width of about 10 microns, and wherein forming the electrolyte comprises forming the electrolyte with a physical vapor deposition (PVD) system.

15. The method of claim 11 further comprising, wherein the encapsulation layer comprises a multilayer stack, wherein the encapsulation layer is about 1 micron thick, and wherein the multilayer stack comprises a plurality of layers comprising at least one of a polymer material and a ceramic material.

16. The method of claim 11 wherein selectively removing at least one of the current collector, electrolyte, anode, and cathode comprises laser-scribing the respective portion of the collector, electrolyte, anode, and cathode.

17. The method of claim 11 further comprising selectively patterning photoresist under the portion of at least one of the collector, electrolyte, anode, and cathode and wherein selectively removing the respective portion of current collector, electrolyte, anode, and cathode comprises lifting off the respective portion of current collector, electrolyte, anode, and cathode by dissolving the photoresist.

18. The method of claim 7, wherein the electrolyte comprises an interstitial electrolyte area, and wherein the cathode finger areas are separated from the anode finger areas by at least the interstitial electrolyte area.

* * * * *